UNITED STATES PATENT OFFICE.

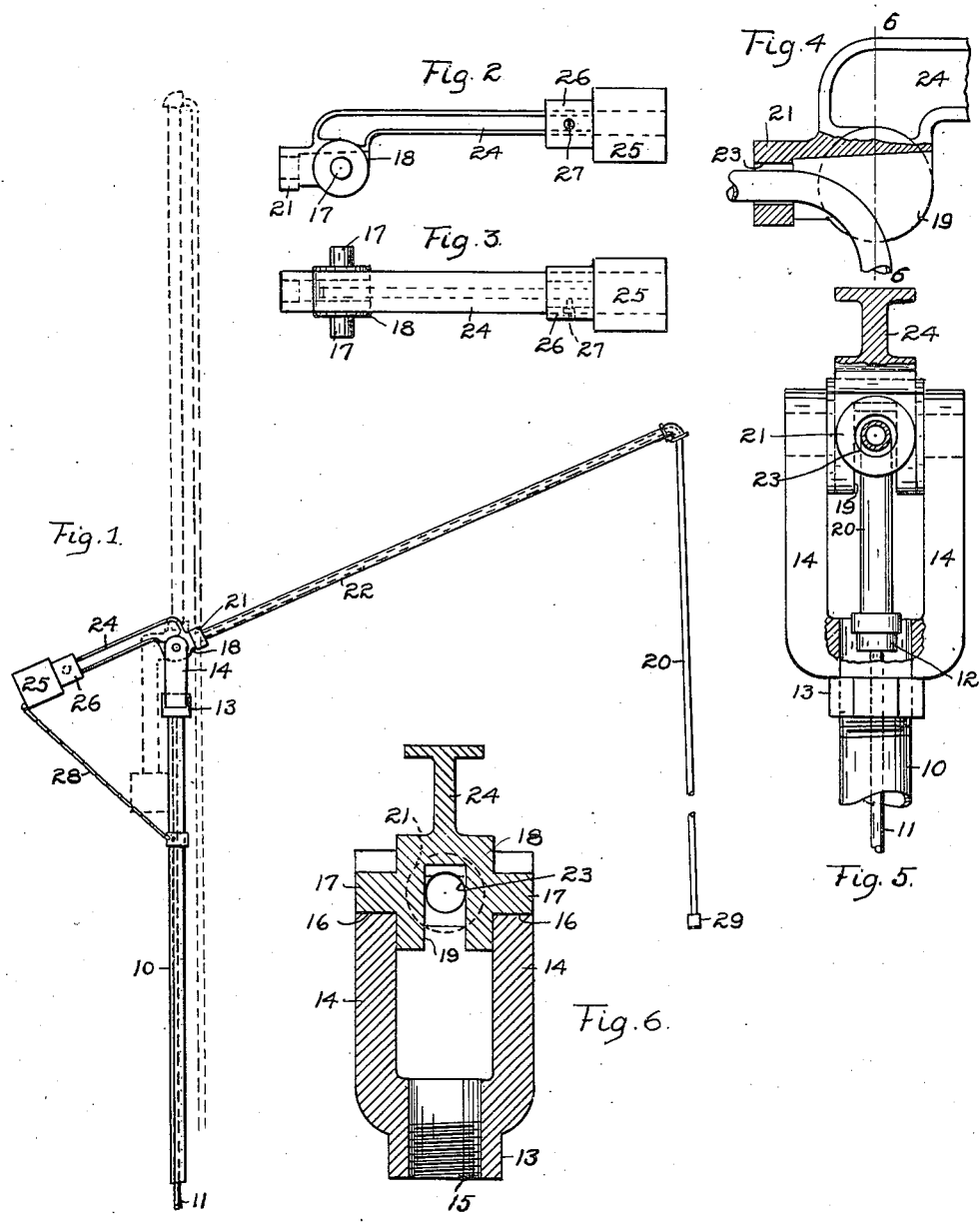

ORPHA P. CANADAY, OF FORT WAYNE, INDIANA.

AIR STAND.

1,412,100. Specification of Letters Patent. Patented Apr. 11, 1922.

Application filed January 22, 1920. Serial No. 353,163.

*To all whom it may concern:*

Be it known that I, ORPHA P. CANADAY, a citizen of the United States, residing at Fort Wayne, in the county of Allen and State of Indiana, have invented new and useful Improvements in Air Stands, of which the following is a specification.

The invention relates to air stands or devices by which air under pressure may be conveniently and readily supplied for various uses. The modern garage and filling station practice is to furnish air under pressure for inflating the tires of motor vehicles, the same being led from the air compressor or storage tank through a suitable pipe to the exterior of the building where a hose connected to the pipe is accessible for attachment to the tire. The object of the invention is to provide a novel form of stand for supporting the hose in convenient position to readily reach any wheel of the vehicle and at the same time affording a maximum of protection to the hose against injury.

In the accompanying drawings I have illustrated an embodiment of the invention in which—

Figure 1 is an elevational view of the stand in operative position; Figure 2 is a side elevational view of the hose tiltable support; Figure 3 is a plan view of the same; Figure 4 is a side elevational view of the tiltable support in enlarged scale and partly in section; Figure 5 a front elevational view of the tiltable and revoluble supports partly in section, and Figure 6 a cross-section of the titltable and revoluble supports on line 6—6 of Figure 4.

Referring to the drawings 10 indicates a suitable pipe or housing having its lower end suitably anchored in the ground or to any other desirable object and 11 indicates the pipe leading from the air compressor or storage tank of air under pressure, the pipe being extended up through pipe 10 and provided at its upper end with a suitable hose coupling 12. The upper end of the pipe 10 is exteriorly threaded to engage in the lower end of casting 13 revolubly mounted on the threaded end of pipe 10 and having two upstanding arms or bifurcations 14, the base of the casting being apertured at 15 to receive the said upper end of pipe 10 and to permit the coupling 12 to be readily accessible. Notches 16 are formed in the upper ends of the bifurcations to revolubly support trunnions 17 projecting laterally from opposite sides of member 18. Member 18 is centrally cored to form a cavity 19 opening towards coupling 12 and to afford ample space in said member within which hose 20 secured to coupling 12 may move to accommodate all movements of member 18. A forward projection 21 on member 18 is apertured to receive pipe 22, the aperture 23 being extended inwardly to open into cavity 19 and through which aperture and pipe 22 the hose is extended. The pipe 22 is of sufficient length to cause its outer end to come well over the top of the vehicle which has been drawn up alongside of the stand so that the hose, or the portion thereof projecting from the outer end of pipe 22 will be accessible for reaching either of the outer wheels of the vehicle adjacent the stand without necessarily touching the ground.

Arm 24 extends upwardly and rearwardly from member 18 and carries at its outer end a weight 25 which tends to descend to its lower most position and thereby rock member 18 upwardly and elevate pipe 22 into substantially a vertical position as shown in dotted outline in Fig. 1. If desirable a counterweight 26 may be adjustably mounted on the arm and secured in any adjusted position by set screw 27. Normally pipe 22 is in vertical position, the projecting portion of the hose extending well down toward the ground. The user, by grasping the hose may both swing the pipe laterally on the housing and also tilt it on member 13. When tilted downwardly from its normal upright position pipe 22 will extend outwardly well over the top of the vehicle so that the hose projecting from its outer ends will be available to reach either of the outer wheels of the vehicle and thereby avoid contact of the hose with the ground unnecessarily. At the same time the hose readily reaches either of the inner wheels. When the pipe 22 is tilted downwardly weight 25 rises, chain 28 secured to housing or pipe 10 and to arm 24 limiting the upward movement of the weight and arm 24. Any suitable valve 29 may be secured to the outer end of hose 20.

It is to be noted that as arm 24 is substantially right angular in shape the arm or portion thereof carrying the weight is substantially parallel to pipe 22 and is above the pivotal point of member 18. This location of the arm permits of the coring of member 18 to form the cavity therein through which the hose passes. The pivotal point of the member 18 is substantially midway between the entrance to pipe 22 and the upper edge of the hose coupling hence the portion of the hose between said entrance and said upper edge is substantially the same on each side of said pivotal point, and therefore no sharp bends occur in said portion of the hose when pipe 22 is rotated or tilted. This freedom of movement of the hose within the pivotal support of the pipe and the support given to the hose by pipe 22 fully protects the hose from injury. When the hose is released after use the descent of weight 25 restores pipe 22 to vertical position and the hose then hangs down alongside of the housing and need not be of such length as to reach the ground. Pipe 22 may be of any desired length, the weight or counterweight on arm 24 being regulated to perform its function or their functions according to the length of pipe 22 and length of hose.

What I claim is:

A device of the character described comprising a hollow standard, a bracket stem disposed at the top of said hollow standard and capable of turning movement thereon, a pair of bracket arms carried by said stem, a support journaled between the ends of said bracket arms, a hollow arm carried by said support and movable in a vertical plane between said bracket arms, said hollow arm having a counter weight at one end and a mouth piece at the other end, and a supply hose carried by said standard and extending through said hollow arm for engagement with said mouth piece.

In witness whereof I have hereunto subscribed my name this 19th day of January, 1920.

ORPHA P. CANADAY.